(12) United States Patent
Kobayashi

(10) Patent No.: US 7,095,701 B2
(45) Date of Patent: Aug. 22, 2006

(54) OPTICAL DISC RECORDING AND/OR REPRODUCING APPARATUS AND ABERRATION ADJUSTMENT METHOD

(75) Inventor: Yuhei Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/159,314

(22) Filed: Jun. 23, 2005

(65) Prior Publication Data

US 2005/0237881 A1    Oct. 27, 2005

Related U.S. Application Data

(63) Continuation of application No. 10/026,740, filed on Dec. 27, 2001.

(30) Foreign Application Priority Data

Dec. 28, 2000 (JP) ............... 2000-403453
Mar. 16, 2001 (JP) ............... 2001-076915

(51) Int. Cl.
*G11B 7/135* (2006.01)

(52) U.S. Cl. .............. 369/112.02; 369/44.23; 369/44.32; 369/53.2

(58) Field of Classification Search ............ 369/112.02
See application file for complete search history.

(56) References Cited

U.S. PATENT DOCUMENTS

| | | | |
|---|---|---|---|
| 5,831,942 A * | 11/1998 | Morimoto et al. ....... 369/13.55 |
| 5,859,818 A | 1/1999 | Tateishi et al. |
| 5,859,822 A | 1/1999 | Inoue et al. |
| 6,151,154 A * | 11/2000 | Ogasawara et al. .... 369/112.02 |
| 6,295,256 B1 * | 9/2001 | Kimikawa et al. ....... 369/44.32 |
| 6,411,577 B1 | 6/2002 | Hirose |
| 6,449,236 B1 * | 9/2002 | Wals et al. ............ 369/112.02 |
| 6,480,454 B1 * | 11/2002 | Wada et al. ........... 369/112.02 |
| 6,628,589 B1 * | 9/2003 | Iwasaki et al. ........ 369/112.02 |
| 6,940,798 B1 | 9/2005 | Noborimoto et al. |

OTHER PUBLICATIONS

Patent Abstracts of Japan, JP 2000-067453, Mar. 3, 2000.

* cited by examiner

*Primary Examiner*—Andrea Wellington
*Assistant Examiner*—Jorge L. Ortiz-Criado
(74) *Attorney, Agent, or Firm*—Oblon, Spivak, McClelland, Maier & Neustadt, P.C.

(57) ABSTRACT

The astigmatic aberration in an optical system is to be adjusted. Specifically, in an optical disc device on which can be selectively loaded a first optical disc having a first index of double refraction or a second optical disc having a second index of double refraction larger than said first index of double refraction, and which includes a liquid crystal device 31 between a light source 11 and an objective lens 15 converging a light beam radiated from said light source on the optical disc 2 loaded on the optical disc device, the voltage applied to the liquid crystal device 31 is adjusted to correct the coma aberration or the astigmatic aberration for the first disc or the second disc, respectively.

2 Claims, 8 Drawing Sheets

2a

2b

OPTICAL DISC RECORDING AND/OR REPRODUCING APPARATUS AND ABERRATION ADJUSTMENT METHOD

CROSS-REFERENCE TO RELATED APPLICATIONS

This application is a division and claims the benefit of priority under 35 U.S.C. §120 from U.S. application Ser. No. 10/026,740, filed Dec. 27, 2001, the entire contents of which are incorporated herein by reference.

BACKGROUND OF THE INVENTION

1. Field of the Invention

This invention relates to a method and an apparatus for recording and/or reproducing information signals for a plurality of sorts of optical discs having reciprocally different values of track pitch of the recording tracks and hence differential recording densities. This invention also relates to a method for adjusting the aberration of the present optical disc recording and/or reproducing method and apparatus.

2. Description of Related Art

In an optical disc used up to now as a recording medium for information signals, attempts have been made for raising the recording density. For example, in the case of a magneto-optical disc having a diameter of approximately 65 mm, proposals have been made for reducing the track pitch of the recording track carrying the information signals from 1.6 μm to 0.95 μm to increase the recording density by a factor of approximately five.

For recording information signals on the magneto-optical disc, having the reduced track pitch as described above, and for reproducing the recording information signals, the spot diameter of the light beam scanning the recording track formed on the magneto-optical disc needs to be of a smaller value. The reason is that, if the spot diameter of the light beam becomes larger than the track pitch of the recording track, the recording track cannot be tracked correctly, with the result that information signals cannot be recorded or reproduced on or from a desired recording track.

Thus, proposals have also been made for using an optical pickup device provided with a light source designed for radiating a light beam of a shorter wavelength for reducing the spot size of the light beam illuminated on the magneto-optical disc. If the optical pickup device, radiating the light beam of the short wavelength, is used for recording and/or reproducing a magneto-optical disc, the desired recording track cannot be tracked correctly, because the spot diameter of the light beam is markedly smaller than the recording track width, with the result that the information signals cannot be recorded or reproduced correctly.

For differentiating the track pitch values of the recording tracks from one another for ultimately enabling recording and/or reproduction of plural sorts of the magneto-optical discs with different recording densities by a common optical disc recording and/or reproducing apparatus, there has also been proposed an optical disc recording and/or reproducing apparatus including an optical pickup device having a plural number of light sources each radiating a light beam of a shorter wavelength and a light beam of a longer wavelength.

This optical disc recording and/or reproducing apparatus is designed to switch between the plural light sources to radiate light beams of different wavelengths to adapt itself to a plural number of sorts of the magneto-optical discs having reciprocally different values of the track pitch of the recording tracks.

With the magneto-optical disc having the track pitch of 1.6 μm, double refraction is more significant than with a magneto-optical disc having a track pitch of 0.95 μm, and hence astigmatic aberration is produced in an optical system when the light beam is transmitted along an optical path in the magneto-optical disc. So, in the optical disc recording and/or reproducing apparatus, dedicated to a magneto-optical disc having a track pitch of 1.6 μm, the value of this astigmatic aberration is supervised with respect to the entire optical system. On the other hand, with the magneto-optical disc having the track pitch of 0.95 μm, the double refraction is lesser than with the magneto-optical disc having a track pitch of 1.6 μm, such that the astigmatic aberration is suppressed in the optical system

[Problems to be Solved by the Invention]

With the above-described optical pickup device, having a plural number of the light sources, the device itself is increased in size to render it difficult to use the device in an optical disc recording and/or reproducing apparatus required to be reduced in size.

With the semiconductor laser, radiating a light beam of a shorter wavelength, such as approximately 650 nm, power consumption is larger than with the semiconductor laser radiating a light beam of a longer wavelength, such as approximately 780 nm. The optical pickup device, employing a semiconductor laser with a larger power consumption, is not suited to a battery-powered portable optical disc recording and/or reproducing apparatus. Additionally, with the semiconductor laser with large power consumption, the temperature coefficient is larger and undergoes significant self-heating, so that, when the semiconductor laser is mounted on an optical pickup device, measures against heat radiation need to be taken to cause stabilized oscillations of the light beam when the semiconductor laser is mounted on the optical pickup device, with the result that it becomes difficult to reduce the size and the thickness of the optical pickup device.

Moreover, the semiconductor laser radiating a light beam of a shorter wavelength is more expensive than the semiconductor laser adapted for oscillating the light beam with a wavelength of 780 nm, which has so far been used extensively, with the result that, if this semiconductor laser is used, it is not possible to reduce the cost of the optical pickup device and hence that of the recording and/or reproducing apparatus.

If, with the use of the optical disc recording and/or reproducing apparatus, dedicated to a magneto-optical disc having a track pitch of 0.95 μm, information signals are recorded or reproduced on or from a magneto-optical disc having a track pitch of 1.6 μm, there is raised a problem that astigmatic aberration is liable to be produced in the recording and/or reproducing optical system.

If, in a recording and/or reproducing apparatus dedicated to a magneto-optical disc having a track pitch of 0.95 μm, information signals are to be recorded or reproduced on or from a magneto-optical disc having the track pitch of 1.6 μm, there is raised a problem that a difference is produced, under the effect of the aforementioned astigmatic aberration, between an optimum point of the focusing bias in detecting the ADER (address in progressive error rate), as an error rate of the ADIP (address in pregroove), and an optimum point of the focusing bias of the RF signals of the magneto-optical disc having the track pitch of 0.95 μm.

It is specifically necessary to electrically offset the focusing bias, optimized for recording and/or reproduction of information signals for a magneto-optical disc having a track pitch of 1.6 µm, with respect to the focusing bias of the optical disc recording and/or reproducing apparatus optimized for recording and/or reproducing information signals on or from a magneto-optical disc having a track pitch of 0.95 µm.

However, the optimum offset undergoes variations, due to the astigmatic aberration present in the individual recording and/or reproducing optical systems, to render offset adjustment difficult.

There are also occasions wherein, depending on changes in shape of the magneto-optical disc or to tilt of the magneto-optical disc, the light beam is not incident at right angles to the recording surface of the magneto-optical disc. In this case, there is raised a problem that the light beam incident on the recording surface of the magneto-optical disc is not reflected in a direction perpendicular to the recording surface of the disc, such that the reflected light beam suffers coma aberration to deteriorate the readout efficiency of the information signals.

It is therefore an object of the present invention to provide a recording and/or reproducing apparatus in which the apparatus may be further reduced in size and thickness and in which information signals can be recorded and/or reproduced on or from a magneto-optical disc having a track pitch of 0.95 µm and a magneto-optical disc having a track pitch of 1.6 µm. It is another object of the present invention to provide a method for adjusting the aberration for such recording and/or reproducing apparatus

SUMMARY OF THE INVENTION

For accomplishing the above object, the optical disc recording and/or reproducing apparatus according to the present invention includes a light source for radiating a light beam having a wavelength approximately 780 nm, an objective lens having a numerical aperture NA of approximately 0.62 and adapted for converging the light beam radiated from the light source to illuminate the optical disc, aberration producing means for producing the aberration in the light beam illuminated on the optical disc and light receiving means for receiving the reflected light from the optical disc. Depending on the disc sort, as found by the disc discriminating means, the aberration producing means is driven to correct the aberration of different sorts produced in the light beam to record and/or reproduce the information signals for the optical disc.

The optical disc recording and/or reproducing apparatus according to the present invention records or reproduces information signals for plural sorts of the optical discs, having different values of the track pitch, while correcting the astigmatic aberration and coma aberration produced in the optical system for optimizing recording and/or reproduction of information signals for plural sorts of the optical disc with different values of the track pitch.

The aberration adjustment method according to the present invention is used for an optical disc recording and/or reproducing apparatus including a light source for radiating a light beam having a wavelength approximately 780 nm, an objective lens having a numerical aperture NA of approximately 0.62 and adapted for converging the light beam radiated from the light source to illuminate resulting converged light on the optical disc, aberration producing means for producing the aberration in the light beam illuminated on the optical disc and light receiving means for receiving the reflected light from the optical disc. The aberration adjustment method includes a first aberration generation means adjustment step of loading one of the plural optical discs with different values of the track pitch of the recording track and hence different values of the recording density, which has the smaller value of the track pitch, on the apparatus, driving the aberration producing means, and correcting the coma aberration based on the information signals read out from the optical disc using light receiving means, and a second aberration generation means adjustment step of loading the optical disc with the larger value of the track pitch, driving the aberration producing means, and correcting the coma aberration based on the information signals read out from the optical disc using light receiving means.

With the aberration adjustment method of the present invention, information signals are recorded or reproduced for plural sorts of the optical discs with different values of the track pitch, while the astigmatic aberration and coma aberration are corrected such as to provide for optimized recording and/or reproduction of information signals for plural sorts of the optical disc having different values of the track pitch.

DESCRIPTION OF THE PREFERRED EMBODIMENTS

Figure 1:
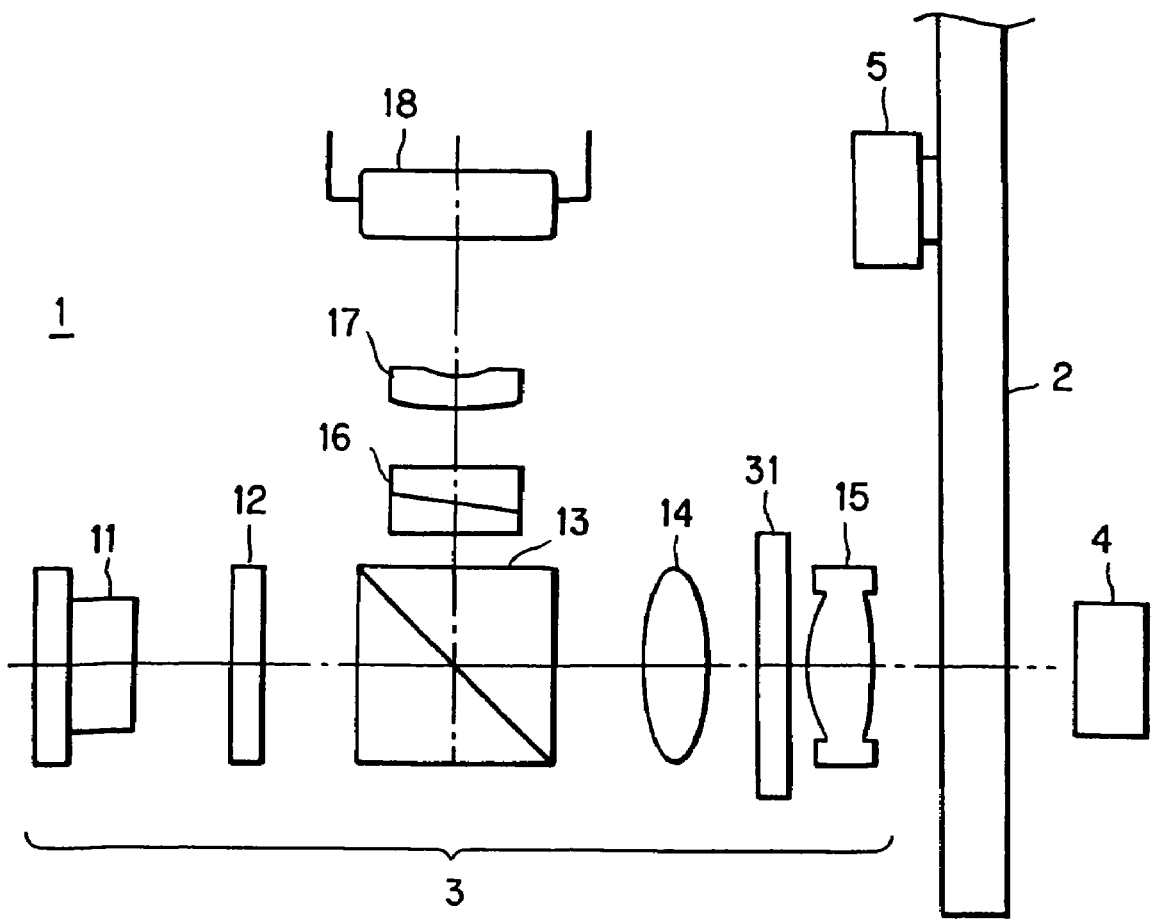
FIG. 1 is a block diagram showing a recording and/or reproducing apparatus to which the aberration adjustment method of the present invention is applied.

Referring to the drawings, preferred embodiments of the present invention will be explained in detail. It should be noted that the present invention is not limited to the embodiments now explained but may be suitably modified without departing from its scope.

FIG. 1 shows an illustrative structure of an optical disc recording and/or reproducing apparatus embodying the present invention.

The present optical disc recording and/or reproducing apparatus 1 includes an optical pickup device 3 having an optical system, not shown, for illuminating a light beam on a magneto-optical disc 2, as a recording medium, and for detecting the light beam reflected from the magneto-optical disc 2, a magnetic head 4 for applying an external magnetic field modulated depending on the information signals to be recorded on the magneto-optical disc 2, and a spindle motor 5 carrying the magneto-optical disc and adapted for operating as a rotating mechanism for rotational driving this magneto-optical disc.

In the optical disc recording and/or reproducing: apparatus 1, embodying the present invention, the magnetic head 4 is mounted facing the optical pickup device 3, with the magneto-optical disc 2 in between, and is movable across the inner and outer rims of the magneto-optical disc 2 in synchronism with the movement of the optical pickup device 3.

The optical pickup device 3, thus provided on the optical disc recording and/or reproducing apparatus 1, includes a semiconductor laser 11, as a light source for outputting a light beam illuminated on the signal recording surface of the magneto-optical disc 2.

This semiconductor laser 11, radiating a light beam having a wavelength approximately equal to 780 nm, is widely used as a light source for an optical pickup device used for reading in the information from an optical disc having the track pitch of the recording track of approximately 1.6 μm.

The optical pickup device 3 includes, on one side of the semiconductor laser 11, a grating 12 and a beam splitter 13 in this order looking from the semiconductor laser 11.

The grating 12 splits a light beam L1, radiated from the semiconductor laser 11, into a main light beam and two subsidiary light beams, for acquiring tracking error signals by a three-beam method.

The beam splitter 13 separates the light beam illuminated on the magneto-optical disc 2 from the return light beam reflected from the magneto-optical disc 2. Meanwhile, a combination prism with a Wollaston prism is used herein as the beam splitter 13.

The optical pickup device 3 includes a collimator lens 14 for collimating the light beam radiated at a preset radiation angle from the semiconductor laser 11, and an objective lens 15 for converging the light beam collimated by the lens 14 and for illuminating the collimated light on a signal recording surface of the magneto-optical disc 2, in this order, when looking along a direction of transmission of the light beam from the semiconductor laser 11 from the beam splitter 13.

The optical pickup device 3 also includes an analyzer 16 for converting the Kerr rotation angle of the return light beam into output light intensity, a multiple lens 17, and a photodetector 18, as light receiving means for receiving the light beam reflected back from the magneto-optical disc 2 and transmitted through the analyzer 16 and the multiple lens 17, in this order, when looking along the direction of reflecting the return light beam of the beam splitter 13 reflected back from the magneto-optical disc 2.

Of these components, the photodetector 18 converts data recorded on the magneto-optical disc 2 into output electrical signals, depending on light volume variations ascribable to the difference in the angle of rotation of the plane of polarization of the received return light beam reflected back from the magneto-optical disc 2.

Meanwhile, such objective lens having the numerical aperture NA equal to approximately 0.62 is used as the objective lens 15 adapted for converging the light beam on the magneto-optical disc 2. The light beam, with the wavelength of 780 nm, transmitted through the objective lens 15 for being converged on and illuminating the magneto-optical disc 2, forms a beam spot, with a spot diameter of approximately 1.53 μm, at the focused position. That is, the light beam with the wavelength of 780 nm is converged by the objective lens 15, with the numerical aperture NA of approximately 0.62, and is illuminated at the focused position of the objective lens 15 on the signal recording surface of the magnetic disc 2, so as to form a beam spot with a spot diameter of approximately 1.53 μm.

Figure 2:
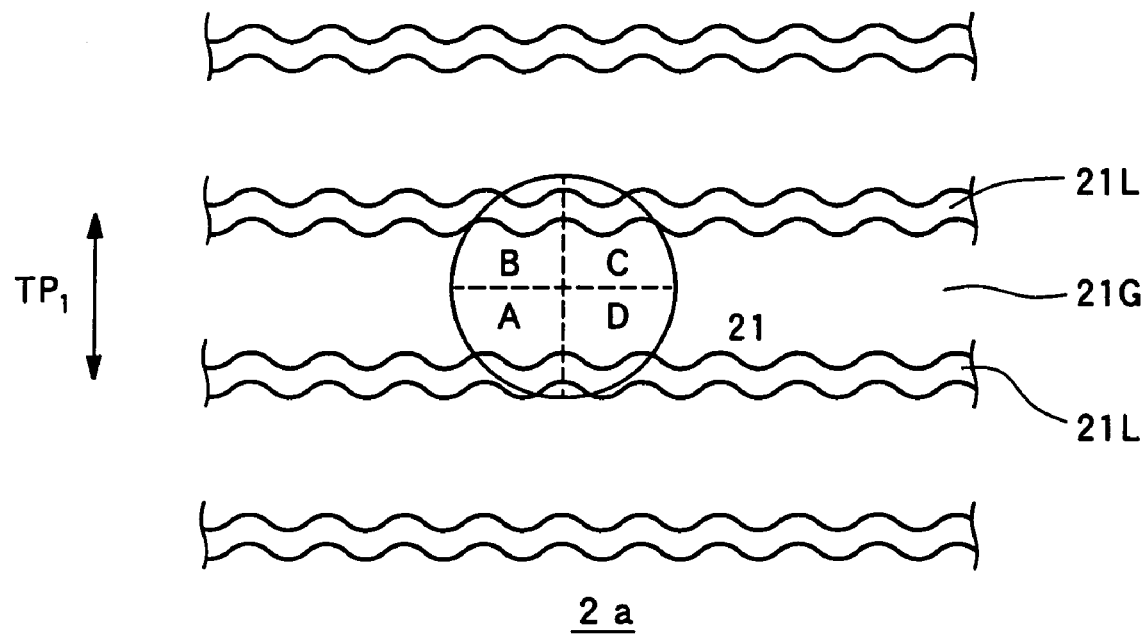
FIG. 2 is a schematic plan view showing a recording track of a first magneto-optical disc.

It should be noted that, in the magneto-optical disc 2 with a diameter of approximately 64 mm, a recording track 21 of a first magneto-optical disc 2a, having a recording capacity of 140 MB, is formed with a track pitch $Tp_1$ of approximately 1.6 μm, as shown in FIG. 2. This recording track 21 includes a groove 21G, as a data recording area, and, on both sides of the groove 21G, wobbled lands 21L for producing track controlling and address detecting signals.

Figure 3:
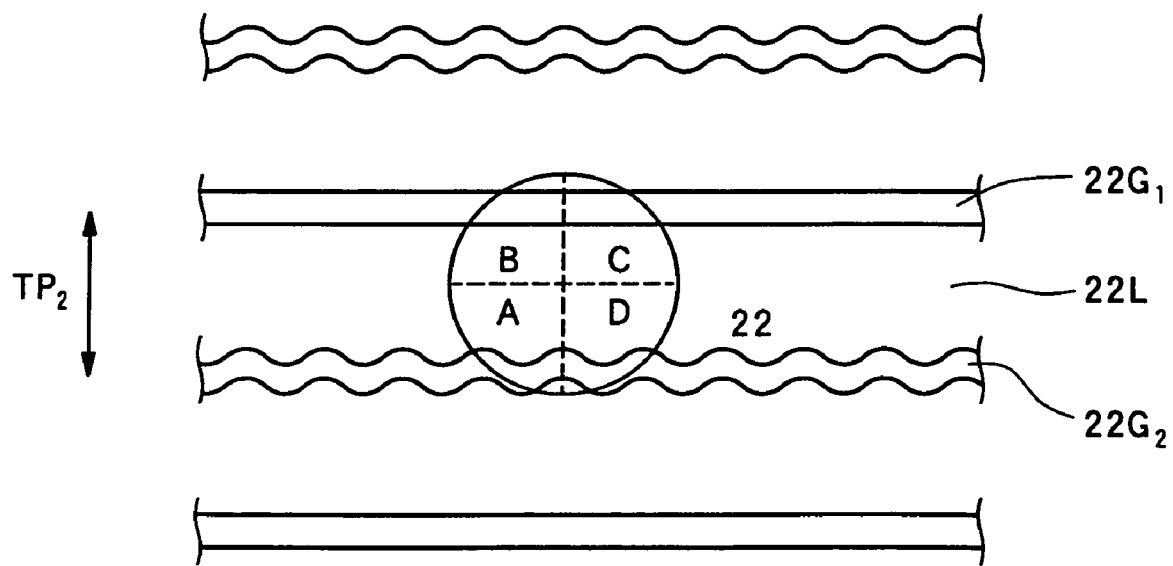
FIG. 3 is a schematic plan view showing a recording track of a second magneto-optical disc.

In the magneto-optical disc 2 with a diameter of approximately 64 mm, a recording track 22 of a second magneto-optical disc 2b, having a recording capacity of 650 MB, is formed to have a track pitch $Tp_2$ of approximately 0.95 μm, as shown in FIG. 3. This recording track 22 includes a data recording area as a land 22L, a groove $22G_1$, on one side of the land 22L, for delimiting the recording track 22, and a wobbled groove $22G_2$ for producing track controlling and address detecting signals, on the opposite side of the land 22L.

It should be noted that, for optimally recording and/or reproducing information signals on or from a desired recording track of the magneto-optical disc 2, the light beam radiated from the optical pickup device 3 needs to correctly scan the recording track of the magneto-optical disc 2. In order for the light beam to correctly scan the recording track of the magneto-optical disc 2, at least tracking controlling signals need to be generated so that the light beam scanning position will be controlled based on this tracking controlling signal. That is, in order for the light beam to correctly scan the recording track by the tracking controlling signals, the light beam needs to be illuminated on the entire width of the recording track to detect the wobbled lands 21L, 22L or the grooves 22G, $22G_1$ and $22G_2$.

With the optical disc recording and/or reproducing apparatus 1, information signals are recorded on or reproduced from the first magneto-optical disc 2a having the track pitch of 1.6 μm and from the second magneto-optical disc 2b having the track pitch of 0.95 μm, by a sole light beam radiated from the semiconductor laser 11 as a sole light source.

So, with the optical disc recording and/or reproducing apparatus 1 according to the present invention, a liquid crystal device 31 as means for generating the aberration is arranged between a collimator lens 14 and an objective lens 15. This liquid crystal device 31 is used to adjust the astigmatic aberration and coma aberration to adjust the beam diameter to record and/or reproduce information signals on or from the first magneto-optical disc 2a having the track pitch of 1.6 μm and the second magneto-optical disc 2b having the track pitch of 0.95 μm.

Figure 4:
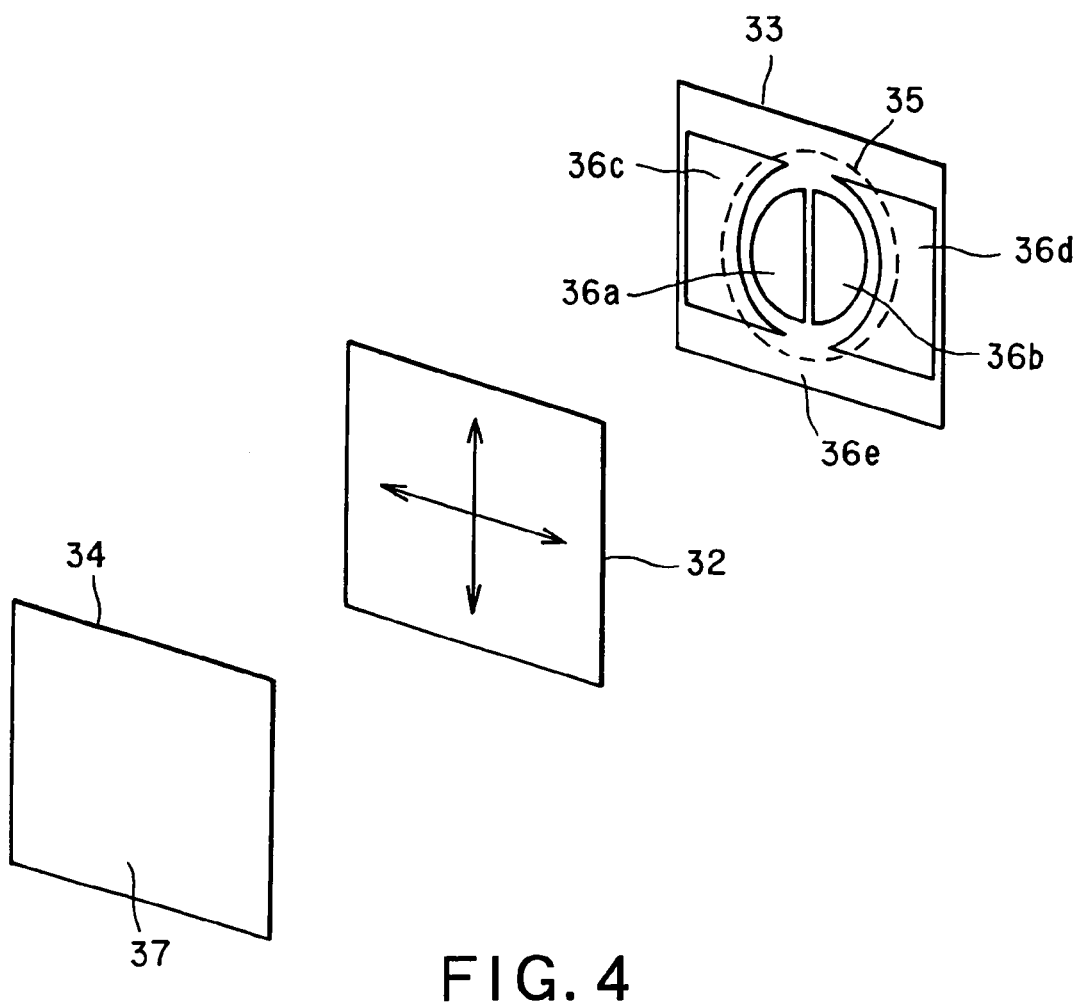
FIG. 4 is a schematic perspective view showing a liquid crystal device employed in the present invention.
Figure 5:
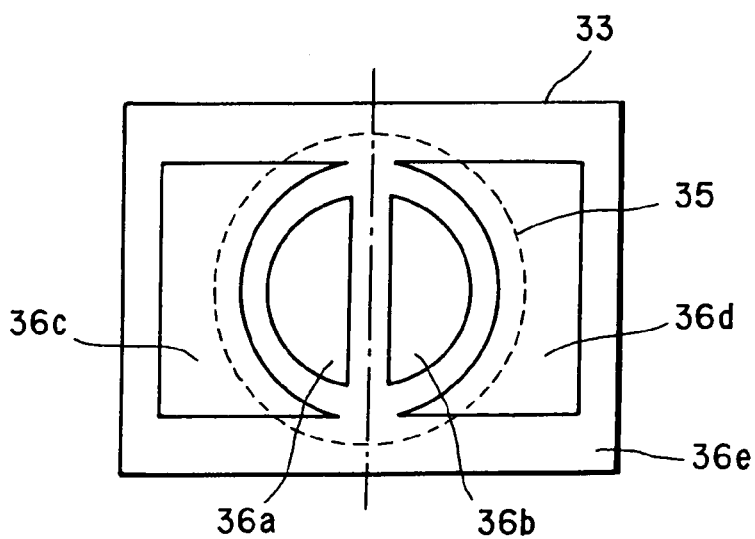
FIG. 5 is a schematic plan view showing each electrode pattern provided on a liquid crystal device.

Specifically, the liquid crystal device 31 a first electrode plate 33 and a second electrode plate 34 are arranged on both sides of a liquid crystal plate 32, including liquid crystal molecules sealed therein, as shown in FIGS. 4 and 5.

Of these electrode plates, the first electrode plate 33 includes a pair of electrode patterns on both sides of a circular aperture 35, transmitting the light beam there through, as a reference. One of these electrode patterns is termed a first electrode pattern 36a, with the other being termed a second electrode pattern 36b.

On the first electrode plate 33, a pair of electrode patterns are formed on the outer sides of the first electrode pattern 36a and the second electrode pattern 36b. The electrode pattern formed on the outer side of the first electrode pattern 36a is a third electrode pattern 36c, while the electrode pattern formed on the outer side of the second electrode pattern 36b is termed a fourth electrode pattern 36d.

Betwixt and around these first to fourth electrode patterns is formed an electrode pattern termed a fifth electrode pattern 37.

On the second electrode plate 34 is formed a common electrode pattern 37 facing these first to fifth electrode patterns 36a to 36e.

Across the first to fifth electrode patterns 36a to 36e and the common electrode pattern 37 is applied a driving voltage of the same or different potential from a liquid crystal driving unit, not shown, connected to each electrode pattern. By the driving voltage being applied across the respective electrode patterns, the driving voltage is applied to the liquid crystal plate 32 to change the orientation of liquid crystal molecules in the liquid crystal plate 32.

Thus, with the present optical disc recording and/or reproducing apparatus 1, the beam diameter of the light beam radiated from the semiconductor laser 11 may be adjusted by the liquid crystal device 31 to effect optimum recording and/or reproduction of information signals on or from the first magneto-optical disc 2a having the track pitch of 1.6 µm and the second magneto-optical disc 2b having the track pitch of 0.95 µm.

In the liquid crystal device 31, the driving voltages $V_{LC1}$, $V_{LC2}$, $V_{LC3}$, $V_{LC4}$ and $V_{LC5}$, applied across the fifth electrode patterns 36a to 36e and the common electrode pattern 37, are applied across the respective electrode patterns, whereby the orientation of the respective liquid crystal molecules is changed responsive to the respective driving voltages $V_{LC1}$ to $V_{LC5}$. With the orientation of the liquid crystal molecules thus changed, phase difference is produced in the light beam traversing the liquid crystal device 31. This phase difference, which depends on the respective driving voltages $V_{LC1}$ to $V_{LC5}$, applied to the liquid crystal device 31, is produced between a polarized light component having the same direction as the orientation of the liquid crystal device 31 and a polarized light component having the direction perpendicular thereto, and assumes locally different values, for the respective electrode patterns, as a function of the different values of the first to fifth driving voltages $V_{LC1}$ to $V_{LC5}$. The liquid crystal device 31 synthesizes the aforementioned phase difference to the astigmatic aberration and the coma aberration, produced in the optical system, to adjust the respective driving voltages $V_{LC1}$ to $V_{LC5}$ so that the RMS (root mean square) value of the wave front aberration of the beam spot, as throttled by the objective lens 15, will be of the least value.

If, in the optical disc recording and/or reproducing apparatus 1, information signals are to be recorded on or reproduced from the first magneto-optical disc 2a, with the track pitch of 1.6 µm, the driving voltages $V_{LC1}$, $V_{LC2}$ and $V_{LC5}$, applied to the first, second and fifth electrode patterns 36a, 36b and 36e of the liquid crystal device 31, respectively, are set at a certain equal potential, whilst the driving voltages $V_{LC3}$ and $V_{LC4}$, applied to the third and fourth electrode patterns 36c, 36d, are set to the same potential different from the potential of the driving voltages $V_{LC1}$, $V_{LC2}$ and $V_{LC5}$, thereby producing astigmatic aberration in the light beam to control the beam spot diameter to adjust the astigmatic aberration.

If information signals are recorded or reproduced on or from the second magneto-optical disc 2b having the track pitch of 0.95 µm, the respective driving voltages $V_{LC1}$ to $V_{LC5}$, applied to the respective electrode patterns of the liquid crystal device 31, are adjusted so as not to produce astigmatic aberration in the light beam. The reason is that the second magneto-optical disc 2b, having the track pitch of 0.95 µm, undergoes double refraction only to a minor extent and hence is subjected to only little astigmatic aberration. Specifically, the driving voltages $V_{LC1}$, $V_{LC4}$ applied to the first and fourth electrode patterns 36a, 36d and the driving voltages $V_{LC2}$, $V_{LC3}$ applied to the second and third electrode patterns 36b, 36c are respectively shifted to the plus side and to the minus side of a reference voltage, which will be explained in detail subsequently, to adjust the coma aberration.

Meanwhile, if the information signals are recorded on or reproduced from the second magneto-optical disc 2b having the track pitch of 0.95 µm, the reference voltage is adjusted and set in advance so that the mean value of the driving voltages $V_{LC1}$ to $V_{LC5}$, applied to the respective electrode patterns and the common electrode pattern 37, will be in the vicinity of 2/λ of the phase difference between a polarizing component having the same direction as the orientation of the liquid crystal molecules of the light beam transmitted through the liquid crystal device 31 and a polarizing component having the direction perpendicular thereto.

Figure 6:
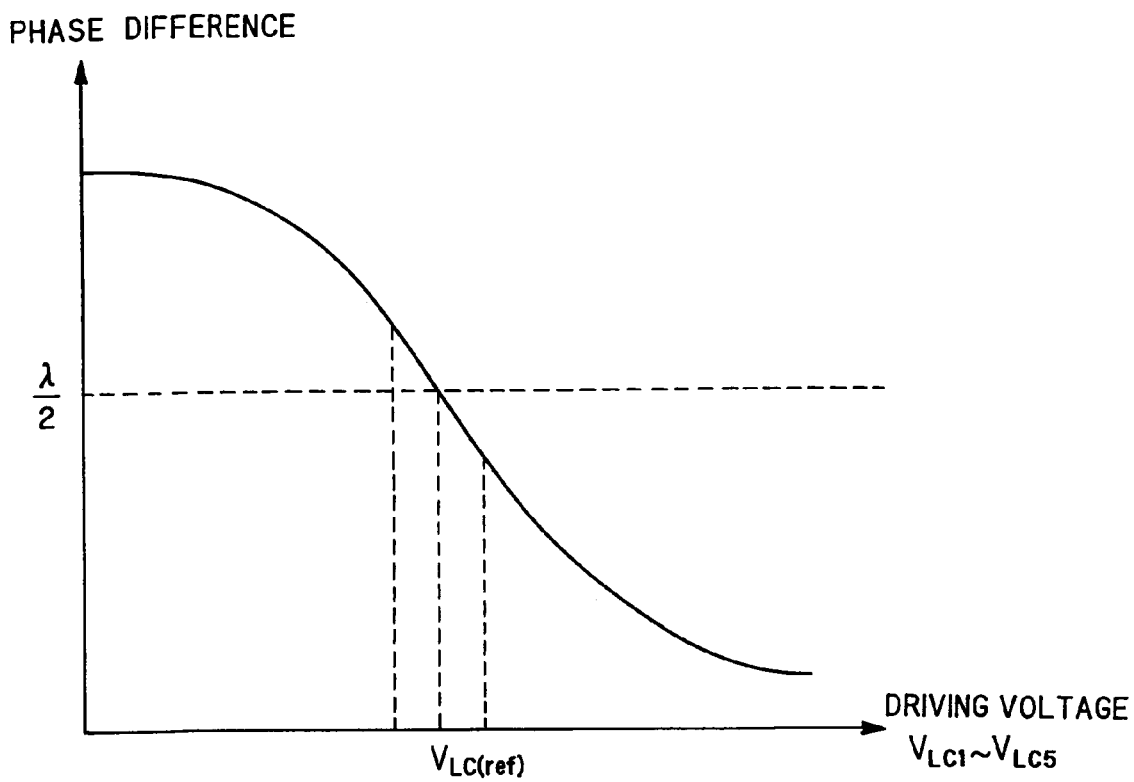
FIG. 6 is a graph showing changes in the phase difference between a polarized component, having the same direction as the direction of orientation of liquid crystal molecules, of a light beam transmitted through the liquid crystal device, and a polarized component, having a direction perpendicular thereto, of the same light beam, with respect to the driving voltage applied to the liquid crystal device.
Figure 7:
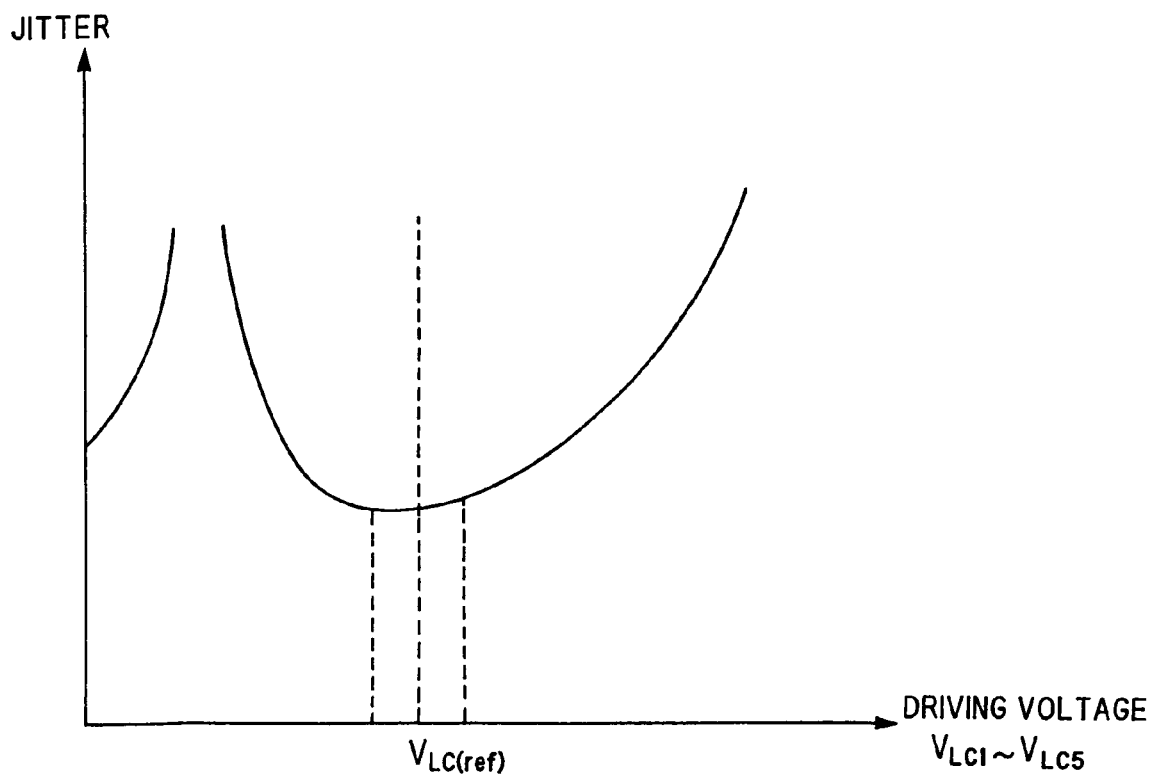
FIG. 7 is a graph showing changes in jitter of read-out RF signals with respect to the driving voltage applied to the liquid crystal device.

FIG. 6 shows changes in the phase difference in case the respective driving voltages $V_{LC1}$ to $V_{LC5}$ to be applied to the respective electrode patterns of the liquid crystal device 31, applied to the respective electrode patterns of the liquid crystal device 31, are set at the same potential, which same potential is changed so that the aforementioned phase difference will be in the vicinity of λ/2. FIG. 7 shows changes in jitter of the read-out RF signals in case the respective driving voltages to be applied to the respective electrode patterns $V_{LC1}$ to $V_{LC5}$, applied to the respective electrode patterns of the liquid crystal device 31, are set at the same potential, which same potential is changed so that the aforementioned phase difference will be in the vicinity of λ/2.

It may be seen from FIGS. 6 and 7 that, in case the respective electrode patterns $V_{LC1}$ to $V_{LC5}$, applied to the respective electrode patterns, are adjusted so that the aforementioned phase difference will be close to λ/2, the jitter of the RF signals is reduced most significantly in a manner most desirable in recording and/or reproducing information signals on or from the magneto-optical disc 2. This adjusted reference voltage is referred to below as the voltage $V_{LC(ref)}$.

If the information signals are recorded or reproduced on or from the second magneto-optical disc 2b having the track pitch of 0.95 µm, there is no necessity for correcting the astigmatic aberration ascribable to double refraction. However, the average voltage of the $V_{LC1}$ to $V_{LC5}$, applied to the respective electrode patterns of the liquid crystal device 31 for correcting the coma aberration, is the voltage $V_{LC(ref)}$ adjusted so that the aforementioned phase difference will be close to λ/2. At this time, the driving voltages $V_{LC1}$, $V_{LC4}$ applied to the first and fourth electrode patterns 36a, 36d and the driving voltages $V_{LC2}$, $V_{LC3}$ applied to the second and third electrode patterns 36b, 36c are respectively shifted to the plus side and to the minus side of a reference voltage, which will be explained in detail subsequently, to adjust the coma aberration.

The driving voltage $V_{LC5}$, applied to the fifth electrode pattern 36e, is kept constant at the voltage $V_{LC(ref)}$. It should be noted that the driving voltages $V_{LC1}$ to $V_{LC4}$ applied to the first to fourth electrode patterns 36a to 36d are shifted so that the average value of the $V_{LC1}$ to $V_{LC5}$, applied to the respective electrode patterns, will remain at the voltage $V_{LC(ref)}$, in such a manner that the jitter of the RF signals read out will be of the least value.

The driving voltages $V_{LC1}$, $V_{LC4}$, and the driving voltages $V_{LC2}$, $V_{LC3}$, adjusted as described above, are referred to below as the voltage $V_{LC(coma+)}$ and as the voltage $V_{LC(coma-)}$, respectively.

If information signals are recorded on or reproduced from the first magneto-optical disc 2a having the track pitch of 1.6 μm, the driving voltages $V_{LC1}$, $V_{LC2}$ and $V_{LC5}$, applied across the first, second and fifth electrode patterns 36a, 36b, 36e and the common electrode pattern 37 are the aforementioned voltage $V_{LC(ref)}$ which is to be the driving voltage different from the driving voltages $V_{LC3}$, $V_{LC4}$ applied across the third and fourth electrode patterns 36c, 36d and the common electrode pattern 37. That is, the driving voltages $V_{LC3}$, $V_{LC4}$ applied across the third and fourth electrode patterns 36c, 36d, applied across the third and fourth electrode patterns 36c, 36d, are adjusted so as to be a voltage optimized for correcting the astigmatic aberration of the optical system.

Figure 8:
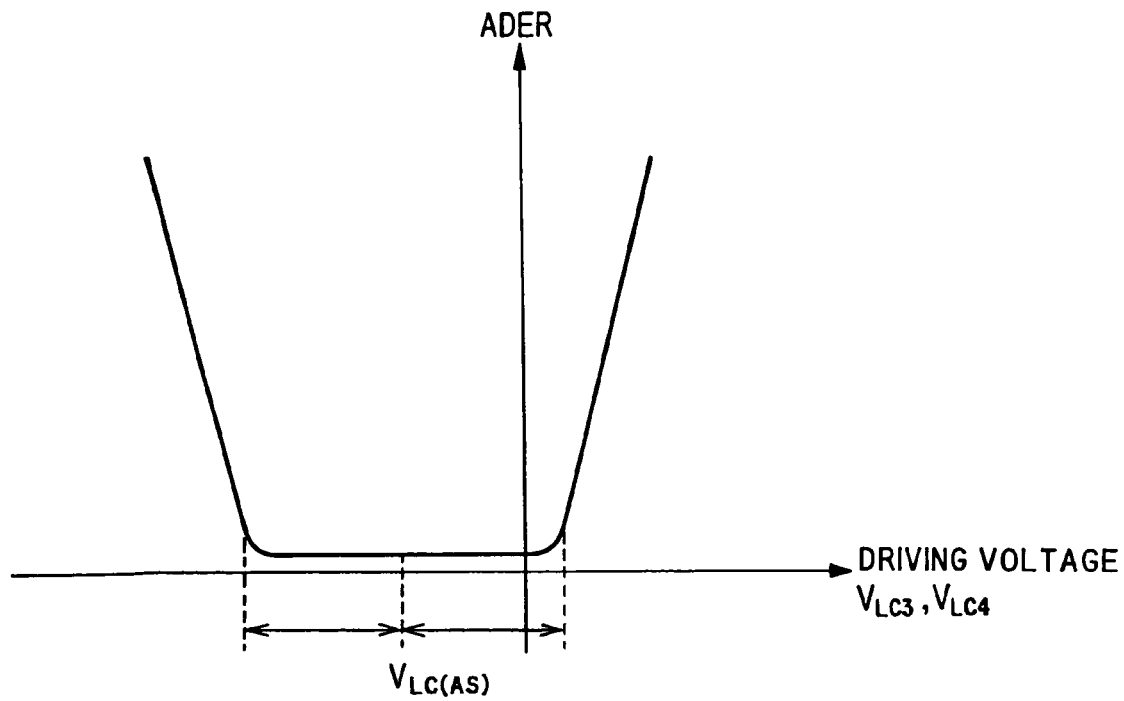
FIG. 8 is a graph showing changes in the error rate of RF signals with respect to a driving voltage applied across first and second electrode patterns and a common electrode pattern of the liquid crystal device.
Figure 10:
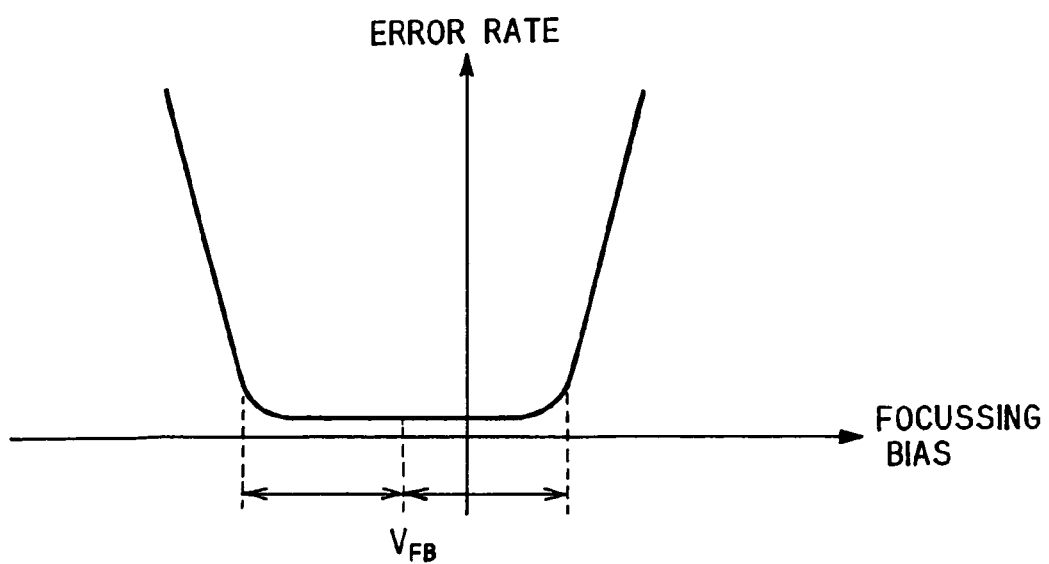
FIG. 10 is a graph showing changes in ADER with respect to the driving voltage applied across the first electrode pattern and the common electrode pattern of the liquid crystal device.

FIG. 8 shows changes in ADER if, in case information signals are to be recorded or reproduced on or from the first magneto-optical disc 2a having a track pitch of 1.6 μm, the driving voltages $V_{LC1}$, $V_{LC2}$ and $V_{LC5}$, applied across the first, second and fifth electrode patterns 36a, 36b, 36e and the common electrode pattern 37, are fixed at the aforementioned voltage $V_{LC(ref)}$, with the driving voltages $V_{LC3}$, $V_{LC4}$ applied to the third and fourth electrode patterns 36c, 36d of the liquid crystal device 31 being changed.

The ADER is now explained only briefly. In FIGS. 2 and 3, the areas A to D represent split areas of the light beam received by the photodetector 18, with the photodetector 18 being split in register with these areas A to D. The photodetector 18 calculates the level of the light beam received by its portions in register with the areas A to D. This level is ADER. That is, ADER may be found by performing the calculations so that, in case the disc is the first magneto-optical disc 2a, the light beam level will be (A+D)−(B+C), or so that, if the disc is the second magneto-optical disc 2b, the light beam level will be (A+B+C+D).

Figure 9:
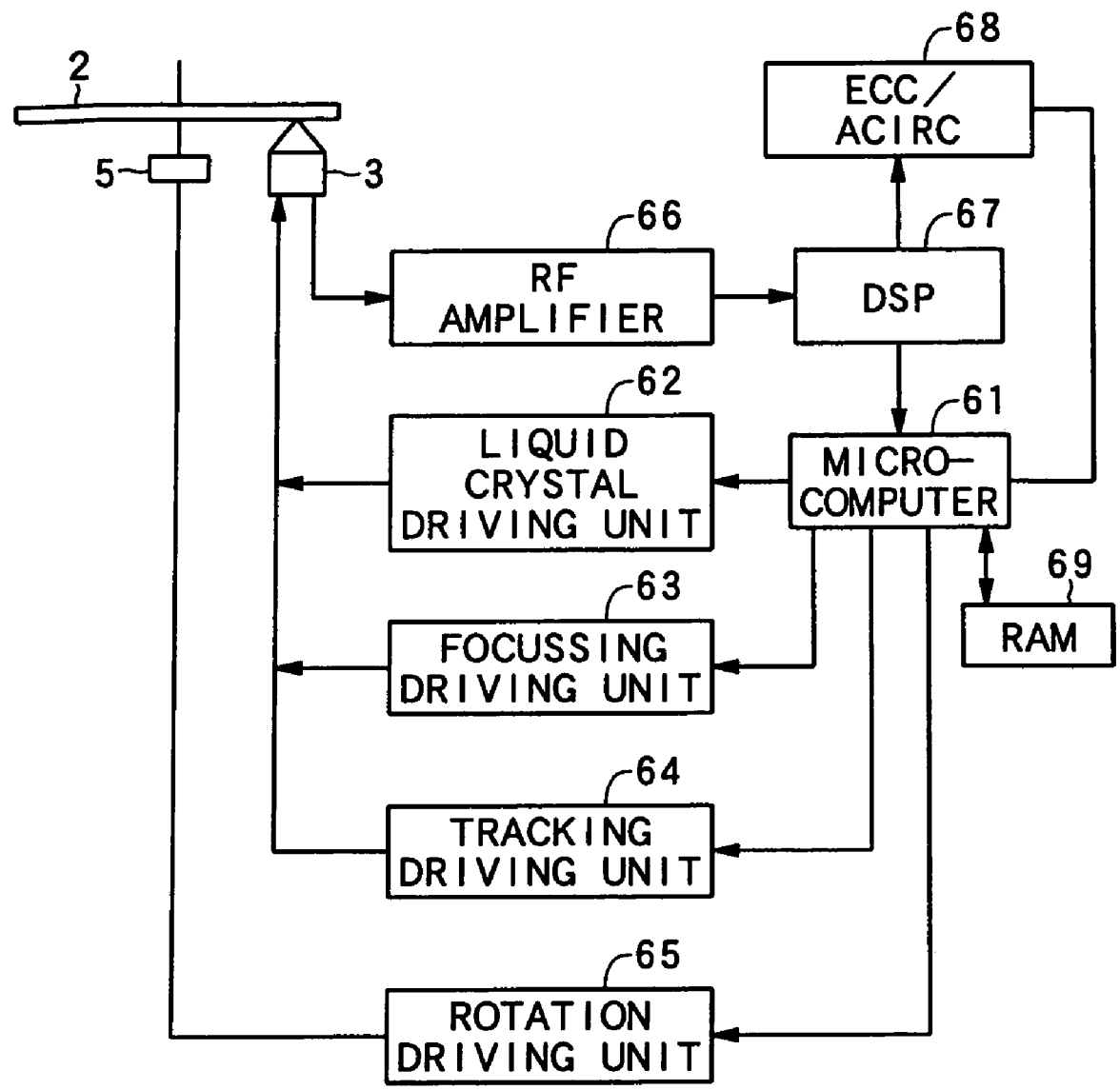
FIG. 9 is a block diagram showing the structure of an aberration adjustment device employed in the present invention.

As may be seen from the graph of FIG. 9, the driving voltages $V_{LC3}$ and $V_{LC4}$ applied to the third and fourth electrode patterns 36c, 36d are adjusted so as to be halfway in a area of the suppressed ADER. This adjusted voltage is VLC(AS).

Thus, if information signals are to be recorded on or reproduced from the first magneto-optical disc 2a with the track pitch of 1.6 μm, the driving voltages $V_{LC3}$ and $V_{LC4}$ applied to the third and fourth electrode patterns 36c, 36d will be the adjusted voltage $V_{LC(AS)}$.

The control of the various portions of the optical disc recording and/or reproducing apparatus 1 and the flow of various signals are now explained with reference to the block diagram of FIG. 9.

The optical disc recording and/or reproducing apparatus 1 includes a micro-computer 61 which is connected to a liquid crystal driving unit 62, driving the liquid crystal device 31, a focusing driving unit 63 and to a track driving unit 64. The liquid crystal driving unit 62, focusing driving unit 63 and the track driving unit 64 are connected to the optical pickup device 3 and controls the driving of the optical pickup device 3 under a control signal from the micro-computer 61.

Based on the control signal from the micro-computer 61, the optical disc recording and/or reproducing apparatus 1 applies respective driving voltages $L_{LC1}$ to $V_{LC5}$ to the respective electrode patterns 36a to 36e of the liquid crystal device 31. At this time, the micro-computer 61 acts as disc discriminating means to decide the sort of the magneto-optical disc 2 to vary and adjust the respective driving voltages $V_{LC1}$ to $V_{LC5}$ to be applied to the respective electrode patterns, depending on the sort of the magneto-optical disc 2.

Based on the control signal from the micro-computer 61, the optical disc recording and/or reproducing apparatus 1 applies the focusing bias to the optical pickup device 3 to effect focusing servo.

It should be noted that the focusing bias is adjusted to be at a mid portion of a voltage range for which RF signals read out from the optical pickup device 3 can be optimally reproduced, that is for which the error rate is suppressed to a low value. This adjusted focusing bias is referred to below as focusing bias $V_{FB}$.

The micro-computer 61 controls the track driving unit 64 so that the optical pickup device 3 will correctly scan the recording track.

Referring to FIG. 8, the micro-computer 61 is connected to a rotational driving unit 65. Based on the control signal from the micro-computer 61, the rotational driving unit 65 controls the spindle motor 5 which then runs the magneto-optical disc 2 in rotation at a preset rpm.

The optical pickup device 3 is connected to an RF amplifier 66, so that RF signals reproduced by the optical pickup device 3 are sent to the RF amplifier 66 where the RF signals are amplified. The RF amplifier 66 is connected to a DSP (digital signal processor) 67 and sends the RF signals to the DSP 67 where the RF signals are converted into digital signals.

The DSP 67 is connected to the micro-computer 61 and to an ECC/ACIRC (Error Correction Code/Advanced Cross Interleaved Reed-Solomon Code) unit 68. From the DSP 67, the ADER, which is an error rate of ADIP, is sent to the micro-computer 61, while EFM (Eight to Fourteen Modulation) signals are sent to the ECC/ACIRC unit 68.

The ECC/ACIRC unit 68 is connected micro-computer 61 and performs decoding and error correction processing on the input EFM signals to send the resulting error rate to the micro-computer 61.

The micro-computer 61 is connected to a RAM (Random Access Memory) 69, as storage means, and adjusts the liquid crystal driving unit 62, focusing driving unit 63 and the track driving unit 64 from various error information sent from the DSP 67 and the ECC/ACIRC unit 68 to store adjusted optimum values of the voltages $V_{LC(ref)}$, $V_{LC(AS)}$, $V_{LC(coma+)}$, $V_{LC(coma-)}$ and the focusing bias $V_{FB}$ in the RAM 69. Meanwhile, an EPROM (Erasable Programmable Read-Only Memory), for example, may be used as RAM 69.

When the optical disc recording and/or reproducing apparatus 1 records or reproduces the information signals on or from the magneto-optical disc 2, the micro-computer 61 decides the type of the magneto-optical disc 2 by the micro-computer 61 to read out the voltages $V_{LC(ref)}$ $V_{LC(AS)}$, $V_{LC(coma+)}$, $V_{LC(coma-)}$ and the focusing bias $V_{FB}$ from the micro-computer 61, as parameters, depending on the so decided type.

If specifically the disc is decided to be the first magneto-optical disc 2a having the track pitch of 1.6 μm, the voltage $V_{LC(ref)}$ is read out as the driving voltages $V_{LC1}$, $V_{LC2}$ and $V_{LC5}$, whilst the voltage $V_{LC(AS)}$ is read out as the driving voltages $V_{LC3}$ and $V_{LC4}$. If the disc is found by the micro-computer 61 to be the second magneto-optical disc 2b having the track pitch of 0.95 μm, the voltage $V_{LC(coma+)}$ is read out as the driving voltages $V_{LC1}$, $V_{LC4}$, the voltage VLC(coma−) is read out as the driving voltages $V_{LC2}$, $V_{LC3}$ and the voltage $V_{LC(ref)}$ is read out as the driving voltage $V_{LC5}$. As for the focusing bias, the focusing bias $V_{FB}$ is read out for any of the two magneto-optical discs.

Figure 11:
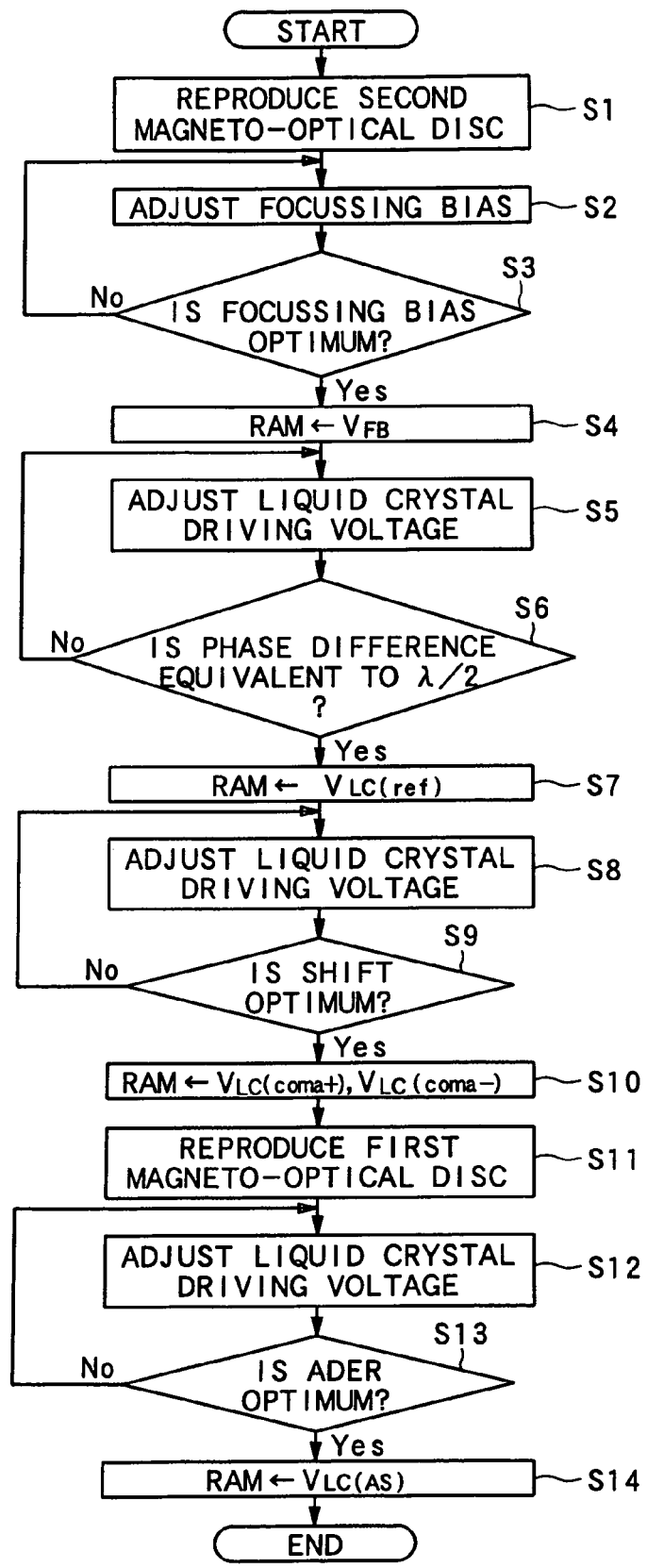
FIG. 11 is a flowchart showing the aberration adjustment method according to the present invention.

The method for adjusting the aberration of the above-described optical disc recording and/or reproducing apparatus 1 is now explained with reference to FIG. 11.

First, at step S1, the second magneto-optical disc 2b, with the track pitch of 0.95 μm, is loaded on the optical disc recording and/or reproducing apparatus 1. Under the control signal from the micro-computer 61, the rotational driving unit 65 controls the spindle motor 5 to run the second magneto-optical disc 2b in rotation. The micro-computer 61 decides the type of the second magneto-optical disc 2b.

Next, at step S2, the control signal from the micro-computer 61 controls the focusing driving unit 63, from which the focusing bias is applied to the optical pickup device 3 to adjust the focal length of the objective lens 15 with respect to the second magneto-optical disc 2b to effect focusing servo based on the error rate of the RF signals read out by the optical pickup device 3. Here, as the driving voltages $V_{LC1}$ to $V_{LC5}$, applied to the respective electrode patterns of the liquid crystal device 31, the voltage $V_{LC(\lambda/2)}$, which is a voltage empirically obtained to give the aforementioned phase difference of λ/2, is used.

Next, at step S3, the micro-computer 61 verifies whether or not the focusing bias is optimum, based on the error rate of the RF signal read out from the optical pickup 3. If the focusing bias is not optimum, the program reverts to step S2. If the focusing bias is optimum, the program moves to step S4.

At step S4, the focusing bias, verified to be optimum by the micro computer 61, is stored as the focusing bias in the RAM 69.

Next, at step S5, the liquid crystal driving unit 62 is controlled by the control signal from the micro-computer 61. Based on the error rate of the RF signals, read out by the optical pickup device 3, the driving voltages $V_{LC1}$ to $V_{LC5}$, applied to the electrode patterns of the liquid crystal device 31, are adjusted so that the phase difference will be in the vicinity of λ/2.

Next, at step S6, the micro-computer 61 verifies whether or not the phase difference is equivalent to λ/2, based on the error rate of the RF signals read out by the optical pickup device 3. If the phase difference is not equivalent to λ/2, the program reverts to step S5. On the other hand, if the phase difference is equivalent to λ/2, the program moves to step S7.

If, at step S7, the micro-computer 61 has verified that the phase difference is equivalent to λ/2, the driving voltages $V_{LC1}$ to $V_{LC5}$, applied across thee respective electrode patterns of the liquid crystal device 31, are stored in the RAM 69 as the voltage $V_{LC(ref)}$.

Next, at step S8, the liquid crystal driving unit 62 is controlled by the control signal from the micro-computer 61. Based on the error rate of the RF signals, read out by the optical pickup device 3, the driving voltages $V_{LC1}$ and $V_{LC4}$, applied to the first and fourth electrode patterns 36a, 36d, respectively, and the driving voltages $V_{LC2}$ and $V_{LC3}$, applied to the second and third electrode patterns 36b, 36c, respectively, are shifted to the plus side and to the minus-side, respectively, with the voltage $V_{LC(ref)}$ as reference, so that the average driving voltage of the respective electrode patterns of the liquid crystal device 31 will be $V_{LC(ref)}$, to adjust the shifting quantity.

Then, at step S9, the micro-computer 61 verifies whether or not the aforementioned shifting quantity is optimum, based on the error rate of the RF signals read out by the optical pickup device 3. If the shifting quantity is not optimum, the program reverts to step S8. If the aforementioned shifting quantity is optimum, the program moves to step S10.

Then, at step S10, if the shifting quantity is verified by the micro-computer 61 to be optimum, the driving voltages $V_{LC1}$ and $V_{LC4}$, applied to the first and fourth electrode patterns 36a, 36d, respectively, and the driving voltages $V_{LC2}$ and $V_{LC3}$, applied to the second and third electrode patterns 36b, 36c, respectively, are stored in the RAM 69 as the voltage $V_{LC(coma+)}$ and as the voltage $V_{LC(coma-)}$, respectively.

Next, at step S11, the second magneto-optical disc 2b, having the track pitch of 0.95 μm, is dismounted, whilst the first magneto-optical disc 2a, having the track pitch of 1.6 μm, is loaded in position. Under control from the micro-computer 61, the rotational driving unit 65 controls the spindle motor 5 to run the first magneto-optical disc 2a in rotation. The micro-computer 61 verifies the type of the first magneto-optical disc 2a.

Then, under control by the micro-computer 61, the liquid crystal driving unit 62 at step S12 applies the voltage $V_{LC(ref)}$ across the first, second and fifth electrode patterns 36a, 36b and 36e of the liquid crystal device 31 and the common electrode pattern 37, while applying driving voltages $V_{LC3}$, $V_{LC4}$ different from the voltage $V_{LC(ref)}$ across the third and fourth electrode patterns 36c and 36d and the common electrode pattern 37. It should be noted that the voltage $V_{LC(ref)}$ is applied and fixed as the driving voltages $V_{LC1}$, $V_{LC2}$ and $V_{LC5}$ across the first, second and fifth electrode patterns 36a, 36b and 36e of the liquid crystal device 31 and the common electrode pattern 37, whilst the driving voltages $V_{LC3}$, $V_{LC4}$, applied across the third and fourth electrode patterns 36c and 36d and the common electrode pattern 37, are varied so that the ADER detected from the RF signals read out by the optical pickup device 3 will be optimum.

At step S13, the ADER is detected from the RF signals read out by the optical pickup device 3, and the micro-computer 61 determines whether or not this ADER is optimum. If the ADER is not optimum, the program reverts to step S12. If the ADER is optimum, the program moves to step S14.

If the micro-computer 61 has verified at step S14 that the ADER is optimum, the driving voltages $V_{LC3}$, $V_{LC4}$, applied to the third and fourth electrode patterns 36c, 36d of the liquid crystal device 31, are stored as the voltages VLC(As) in the RAM 69.

By the above procedure, the focusing bias $V_{FB}$ and the voltages $V_{LC(ref)}$, $V_{LC(AS)}$, $V_{LC(coma+)}$ and $V_{LC(coma-)}$ are stored in the RAM 69. When recording or reproducing information signals on or from the magneto-optical disc 2 of the optical disc recording and/or reproducing apparatus 1, the above voltages may be used for correcting the astigmatic aberration or coma aberration.

Meanwhile, it is assumed that, in adjusting the aberration of the optical disc recording and/or reproducing apparatus 1, the voltage $V_{LC(\lambda/2)}$ is pre-stored in the RAM 69.

The adjustment of the driving voltages $V_{LC1}$ to $V_{LC5}$ to be applied to the respective electrode patterns of the liquid crystal device 31 is preferably completed before shipment of the optical disc recording and/or reproducing apparatus 1 as a product, whereby the adjustment of the recording and/or reproducing optical system of the individual optical disc recording and/or reproducing apparatus 1 may be facilitated.

In the above-described embodiment, the first optical disc is loaded and adjusted after initially loading and adjusting the second magneto-optical disc. As an operating procedure, this process may be reversed, that is, the second optical disc may be loaded and adjusted after initially loading and adjusting the first magneto-optical disc.

In this latter case, the same processing as that of steps S1 to S7 is carried out for the first magneto-optical disc, such that the focusing bias $V_{FB}$ and the reference voltage $V_{LC(ref)}$ matched to the optical properties of the first magneto-optical disc are stored in the memory.

After storing the reference voltage $V_{LC(ref)}$ in the memory, $V_{LC(AS)}$ is adjusted and the second magneto-optical disc is substituted for the first magneto-optical disc. Based on the reference voltage $V_{LC(ref)}$, the voltages $V_{LC(coma+)}$, and $V_{LC(coma-)}$ are adjusted and stored in the memory.

According to the present invention, as described above, information signals may be recorded on or reproduced from the magneto-optical discs 2, having reciprocally different values of the track pitch of the recording track and hence different values of the recording density, with the aid of the liquid crystal device 31. Moreover, astigmatic aberration and coma aberration can be corrected extremely readily in a recording and/or reproducing optical system for magneto-optical discs. In addition, in the optical disc recording and/or reproducing apparatus 1, since there is no necessity for the optical pickup device 3 to have a plural number of light sources, the device can be reduced in size, thickness and cost.

Figure 12:
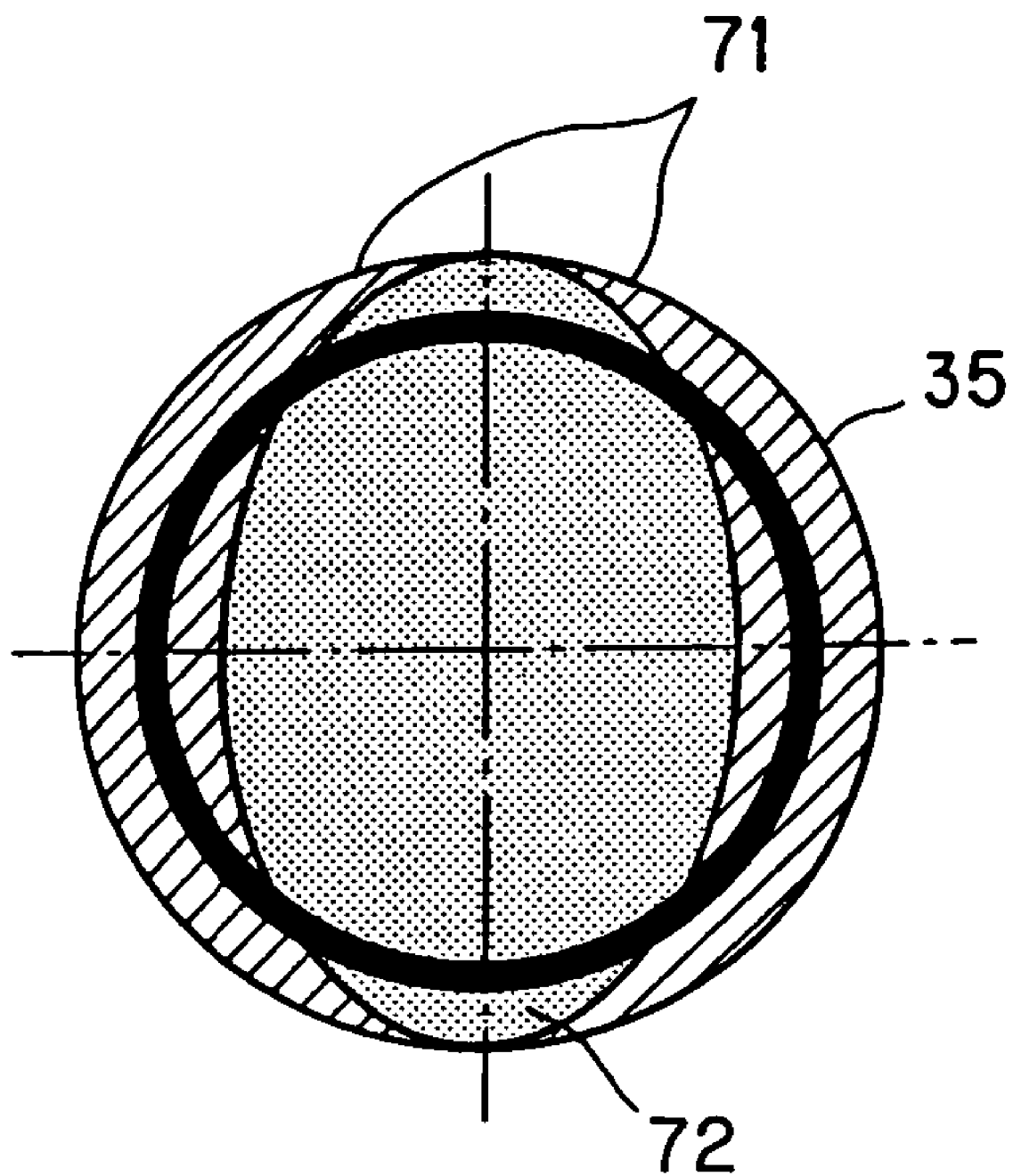
FIG. 12 is a schematic plan view showing another embodiment of each electrode pattern provided in the liquid crystal device.

In a modification of the liquid crystal device, astigmatic aberration may be corrected using a generalized electrode patters, as shown in FIG. 12. In this case, the astigmatic aberration may be corrected by applying different values of the driving voltage to two electrode patterns, namely a pair of crescent-shaped electrode patterns 71 on both sides of an apertura 35 and an elliptically-shaped electrode pattern 72 surrounded by the electrode patterns 71. However, in this case, correction means for correcting the coma aberration, such as liquid crystal devices, are needed. Thus, the liquid crystal device 31, capable of correcting the astigmatic aberration and the coma aberration by the sole liquid crystal device, is more preferred in the perspective of simplifying the device structure and reducing the cost.

What is claimed:

1. A method for adjusting an aberration in an optical disc device on which can be selectively loaded a first optical disc having a first index of double refraction or a second optical disc having a second index of refraction larger than said first index of double refraction, and which includes a liquid crystal device between a light source and an objective lens converging a light beam radiated from said light source on the optical disc loaded on said optical disc device, said method comprising:

an optimizing step of optimizing a focusing bias if the loaded optical disc is the first optical disc;

a step of storing a value of the focusing bias optimized at said optimizing step;

a first adjustment step of adjusting a voltage applied to said liquid crystal device so that the phase difference between a polarized light component along the arraying direction of said liquid crystal device and another polarized light component along a direction perpendicular to said arraying direction of said liquid crystal device will be approximately $\lambda/2$, where $\lambda$ is the wavelength;

a step of storing the voltage adjusted in said first adjustment step as a reference voltage in a memory;

a second adjustment step of adjusting the voltage applied to said liquid crystal device so as to correct a coma aberration based on said reference voltage; and a step of storing the voltage adjusted at said second adjustment step in the memory as a coma aberration correcting voltage.

2. The aberration adjustment method according to claim 1 wherein, if the second disc is loaded after said second adjustment step, an astigmatic aberration is corrected based on the reference voltage as adjusted at said first adjustment step.

* * * * *